United States Patent [19]

Clukey

[11] Patent Number: 5,868,867
[45] Date of Patent: Feb. 9, 1999

[54] VEHICLE SIDE VIEW MIRROR CLEARING DEVICE

[76] Inventor: Mark A. Clukey, 205 E. Beaver Ave., #47, State College, Pa. 16801

[21] Appl. No.: 788,171

[22] Filed: Jan. 24, 1997

Related U.S. Application Data

[63] Continuation-in-part of Ser. No. 446,422, May 22, 1995, abandoned.

[51] Int. Cl.⁶ .............................. B08B 7/04; B08B 3/00; A47L 5/38; A47L 15/00
[52] U.S. Cl. ........................... 134/37; 134/34; 15/300.1; 15/301; 15/316.1; 15/313; 296/84.1; 296/91; 296/92; 296/96.15; 454/123
[58] Field of Search ...................... 134/34, 37; 276/84.1, 276/91, 92, 96.15; 15/300.1, 301, 316.1, 313; 454/123

[56] References Cited

U.S. PATENT DOCUMENTS

| | | | |
|---|---|---|---|
| 3,866,258 | 2/1975 | DeGraw | 15/250.29 |
| 4,134,612 | 1/1979 | Nelson | 296/84 |
| 4,307,482 | 12/1981 | Palmer | 15/250 |
| 4,527,301 | 7/1985 | Seitz | 15/250 |
| 4,550,988 | 11/1985 | Harder et al. | 350/584 |
| 5,140,719 | 8/1992 | Cowan | 15/313 |
| 5,150,497 | 9/1992 | Preik | 15/250.003 |
| 5,179,470 | 1/1993 | Olson | 359/509 |
| 5,179,758 | 1/1993 | Smith et al. | 15/250.003 |
| 5,353,466 | 10/1994 | Smith et al. | 15/250.003 |
| 5,486,139 | 1/1996 | Papp | 454/123 |

FOREIGN PATENT DOCUMENTS

| | | | |
|---|---|---|---|
| 2321027 | 11/1974 | Germany | 15/313 |
| 56-8739 | 1/1981 | Japan | 15/313 |
| 1749082 | 7/1992 | U.S.S.R. | 15/313 |

*Primary Examiner*—Lynette F. Smith
*Assistant Examiner*—Brett Nelson
*Attorney, Agent, or Firm*—John J. Elnitski, Jr.

[57] ABSTRACT

Disclosed is a device to remove moisture from a side view mirror and adjacent side window of a vehicle. The device increases mirror clarity and can be installed on a side view mirror housing at the factory or as an after factory installation. The device prevents moisture from interfering with the operator's visual use of the mirror by utilizing the cleansing effects of existing air flow about the mirror housing during vehicle movement when it redirects the air flow past the mirror surface. The device also uses the air flow to prevent the build up of moisture on the adjacent side window of the vehicle. The device can be adapted to accommodate any existing vehicle mirror design that is incorporated into the door frame or in close proximity. The device is a semi-rigid mirror attachment that mounts on the mirror housing without obstructing the operator's field of vision. The device allows for easy installation, minimal change to vehicle appearance and requires no control by operator to perform the function of removing moisture from the mirror and window.

10 Claims, 4 Drawing Sheets

5,868,867

VEHICLE SIDE VIEW MIRROR CLEARING DEVICE

This application is a continuation-in-part of application Ser. No. 446,422, filed May 22, 1995, now abandoned.

BACKGROUND OF THE INVENTION

There have been many attempts to provide an apparatus for side view mirrors of a vehicle that remove moisture from the mirror surface due to interference with the operator's visual use of the mirror. Some of the attempts have been encumbered by the need for blower systems throughout the vehicle, where the blower system needs to be designed into the vehicle or mirror housing. Other attempts utilize mechanical components such as a wiper blade or wiper arm. Both of these mentioned attempts are relatively expensive and do not allow for the easy addition of such a device to an existing mirror already mounted to a vehicle. Still other attempts have produce devices which come between the vehicle operator and a usable portion of the mirror. This type of device provides viewing problems, whereby even if the device is transparent, it is prone to fogging due to environmental conditions.

It is an object of this invention to provide an inexpensive, easily installed device to keep side view mirrors and front side windows free of moisture. Another object of the invention is to provide a device that is easy to manufacture which requires minimal maintenance by the operator. A further object of the invention is to channel or redirect air flowing over a mirror housing and onto the mirror and window surfaces, thereby preventing accumulation of moisture on the mirror and window surfaces without the operator being required to initiate, control or maintain this action. Yet another object of the invention is to perform the above objectives without obscuring the operator's field of vision.

SUMMARY OF THE INVENTION

A vehicle side view mirror clearing device for clearing a mirror surface that is mounted to a side view mirror housing by an attachment flange. The device captures air flow about the mirror housing using an induction port and redirects the air toward the mirror surface with a redirection surface. The device includes supports which interconnect the redirection surface and the attachment flange, thereby forming the induction port. The device further includes flex points at the redirection surface and at the supports to prevent damage to the device. Finally, the device includes an outlet port to direct a portion of the redirected air flow towards an adjacent window of the vehicle.

DETAILED DESCRIPTION

The present invention provides a device that can be easily mounted to existing side view mirrors on a vehicle. As will be explained hereinafter in more detail, the side view mirror clearing device is simple to mount, aids in clearing moisture from the side view mirror and adjacent side window of the vehicle, and does not obstruct the field of vision of the vehicle operator. Also, the device provides a means of using the air flow around a mirror housing during vehicle movement, while minimizing disturbance of the aerodynamics involved.

Figure 1:
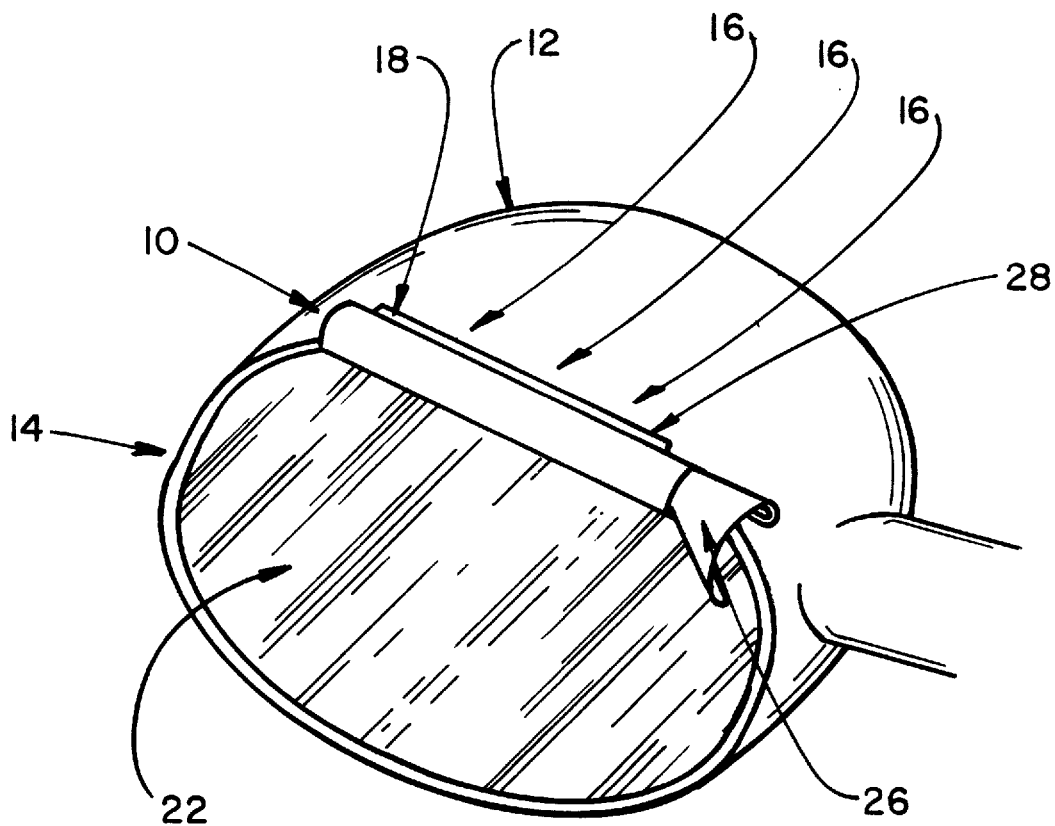
FIG. 1 is a perspective view of the device mounted to a side view mirror according to the present invention.
Figure 2:
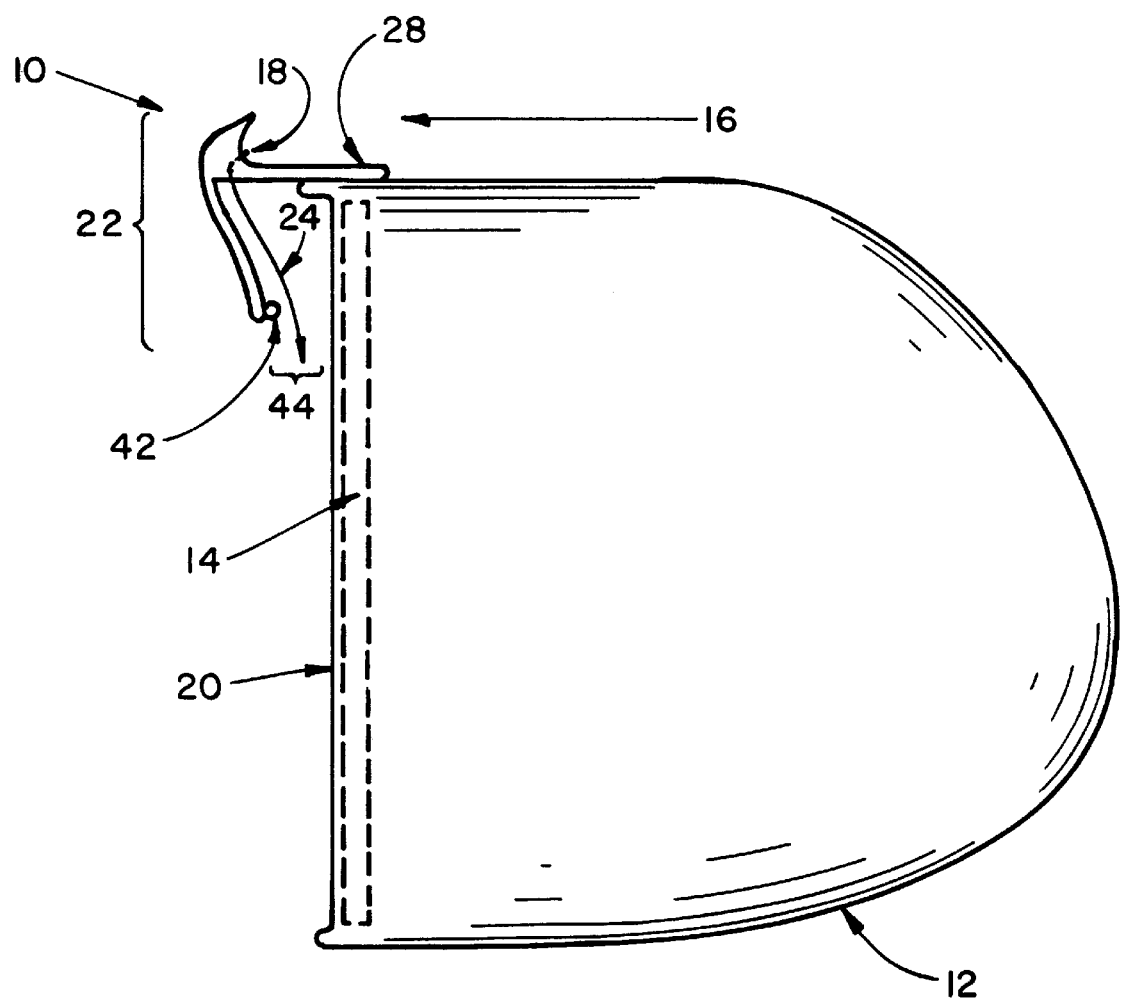
FIG. 2 is a side view of the device shown in FIG. 1.

FIGS. 1 and 2 illustrate the side view mirror clearing device 10 mounted to a vehicle mirror housing 12 which contains a mirror 14. The device 10 can be mounted to the housing 12 by any of the presently known fastening techniques, such as adhesive, adhesive tape or screws. In the case of FIGS. 1 and 2, the device 10 is mounted to the top of the housing 12, although it is envisioned that the device 10 can be formed to attach to any portion of the housing 12, such as the sides of the housing 12. The air flow travels over the housing 12 in the direction of arrows 16 due to the motion of the vehicle (not shown) and a portion of the air flow is captured by an induction port 18 of the device 10. The induction port 18 is situated slightly above the mirror housing 12 to capture the air flow. The air flow over the housing 12 is then redirected past the mirror surface 20 by a redirection surface 22, as illustrated by arrow 24. The redirection surface 22 extends about and from the induction port 18. The redirection surface 22 can be made of a number of known materials that can be formed into this type of shape that is shown in FIGS. 1–4. This redirection of air flow is used to remove the moisture that can accumulate on the mirror surface 20. The device 10 includes an outlet port 26 which directs a portion of the redirected air flow past an adjacent side window (not shown) of a vehicle to remove moisture that can accumulate on the window.

Figure 3:
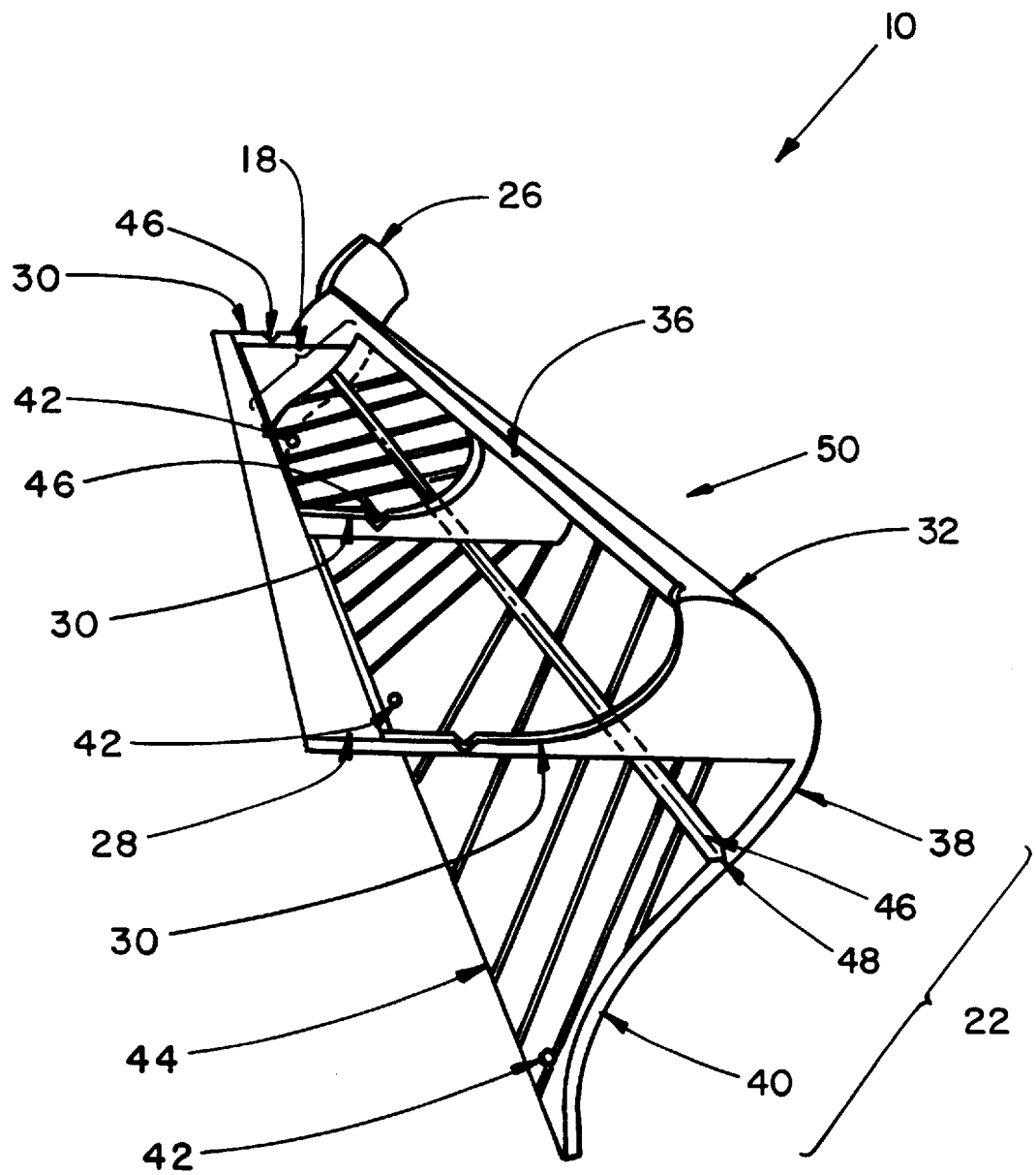
FIG. 3 is a perspective view of the device according to the present invention.
Figure 4:
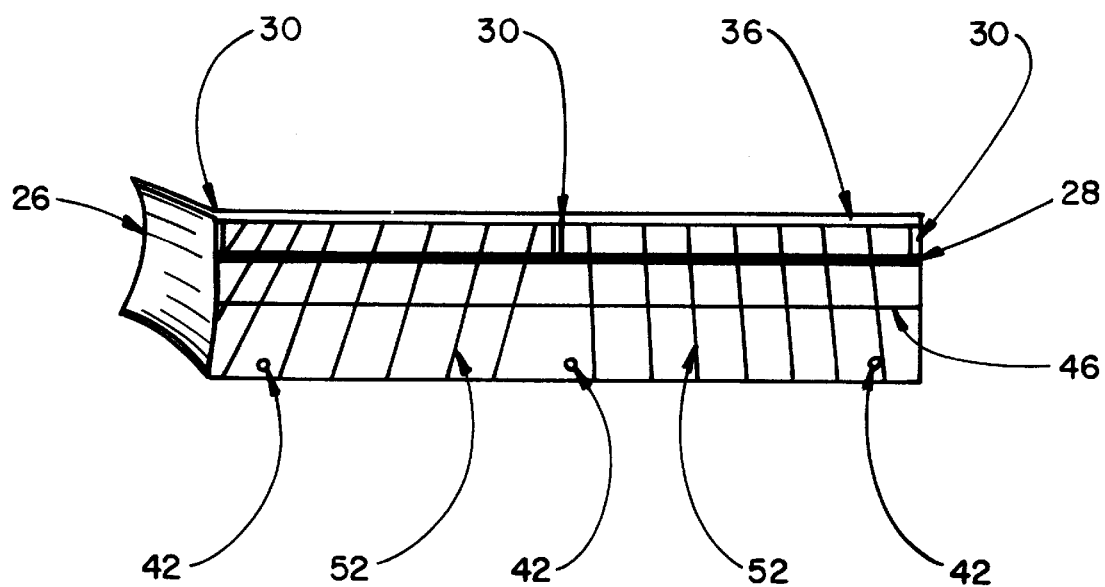
FIG. 4 is a front view of the device shown in FIG. 3.

As shown in more detail in FIGS. 3 and 4, an attachment flange 28 extends along the width of the device 10 and has three supports 30 extending from the attachment flange 28. The supports 30 are positioned along the width of the device 10 so that there is one at each end and one in the middle. An upper concave surface 32 which forms part of the redirection surface 22 is supported by the supports 30. The combination of the supports 30 and the upper concave surface 32 forms the induction port 18. The supports 30 can take many shapes and sizes, but they must be strong enough to support the device 10 and in this case the supports 30 also act as sides for the induction port 18. Included at the entrance of the induction port 18 is a lip 36 which extends upward and backward. The lip 36 is a rounded edge that minimizes the turbulence that can be created due to air flow that is not captured, but flows over the device 10. Extending downward from the upper concave surface 32 is a lower concave surface 38 which also forms part of the redirection surface 22. The lower concave surface 38 redirects the air flow towards the mirror surface 20. Extending downward from the lower concave surface 38 is a convex surface 40 which forms the final part of the redirection surface 22 and directs the air flow past the entire mirror surface 20. The convex surface 40 includes small stops 42 at an exit end 44 of the redirection surface 22. The stops 42 are used to restrict the redirection surface 22 from contacting the mirror surface 20 and restricting the air flow. The device 10 also includes v-cuts 46 in the supports 30 and at the transition point 48 between lower concave surface 38 and convex surface 40 that act as flex points. The v-cuts 46 allow the device 10 to flex during movement of the mirror surface 20 by the operator or when device 10 is bumped into from some object. In the case of the v-cut 46 at point 48, the convex surface 40 is allowed to flex outward if the mirror surface 20 moves against the convex surface 40. In the case of the v-cut 46 at the supports, the majority of the device 10 is allowed to flex forward if the mirror surface 20 moves pushing the convex surface 40 outward or if some object exerts pressure against the back side 50 of the device 10. The flexing at the v-cuts 46 reduces the stress place on the attachment flange 28 if the mirror surface 20 moves or the device 10 is bumped into, so that the device 10 is not easily broken away from the mirror housing 12. The outlet port 26 is positioned on the side of the device 10 depending on whether the device 10 will be on the left or right side of the vehicle and can be molded as part of the redirection surface 22. The outlet port 26 is positioned to direct a portion of the air flow toward the adjacent side window (not shown). The inside of the redirection surface 22 can include ridges 52 as shown in FIGS. 3 and 4. The ridges 52 aid in directing the air flow across the mirror surface 20 and some of the air flow towards the outlet port 26. The ridges 52 are to be position to give the optimum control of the air flow. In the case of FIGS. 3 and 4, the ridges 52 are angled so that some of the air flow moves away from the outlet port 26 and some moves toward the port 26.

The device 10 can be formed out of one of the many materials on the market such as metal, plastic, or fiberglass and is not limited to material or method of manufacture. While one embodiment has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given full breath of the appended claims and any and all equivalents thereof.

I claim:

1. A vehicle side view mirror clearing device for clearing a mirror surface enclosed by a mirror housing comprising:
    an attachment flange that attaches directly to a top of the mirror housing;
    a redirection surface for capturing air flow traveling over said top of the mirror housing which consists of an upper concave surface which captures and directs said captured airflow downward, a lower concave surface which extends downward from said upper concave surface for redirecting said captured air flow towards said mirror surface, and a convex surface which extends downward from said lower concave surface further directing all of said air flow from said lower concave surface past said mirror surface;
    at least one support which supports said redirection surface from and above said flange; and
    an induction port for capturing said air flow, said induction port being an open area between said flange and redirection surface.

2. The device of claim 1, further including a flex point between said lower concave surface and said convex surface, whereby said concave surface and said convex surface are allowed to flex in relationship to each other.

3. The device of claim 1, further including a flex point at said support between said flange and said redirection surface, whereby said redirection surface is allowed to flex in relationship to said flange.

4. The device of claim 1, further including at least one stop on said convex surface to restrict said redirection surface from contacting said mirror surface.

5. The device of claim 1, further including ridges on said redirection surface for aiding in directing of said captured air flow past the mirror surface.

6. The device of claim 1, further including an outlet port integrated with said redirection surface to direct a portion of said air flow traveling over said top of the mirror housing towards an adjacent window.

7. The device of claim 6, further including ridges on said redirection surface for aiding in directing some of said captured air flow towards said outlet port.

8. The device of claim 1, further including a round lip extending upward and backward from said redirection surface at the induction port to reduce turbulence from the air flow that is not captured.

9. A method of clearing a vehicle side view mirror surface enclosed by a mirror housing comprising:
    a) capturing air flow traveling over a top of the mirror housing;
    b) redirecting said captured air flow downward using a first surface that is concave shaped;
    c) redirecting said captured air flow towards and past said mirror surface from said first surface using a second surface that is concave shaped; and
    d) redirecting all of said captured air flow from said second surface past said mirror surface using a third surface that is convex.

10. The method of claim 8, further including the step of clearing an adjacent side window of the vehicle which is next to the side view mirror by directing a portion of said air flow traveling over said top of the mirror housing to said side window.

* * * * *

UNITED STATES PATENT AND TRADEMARK OFFICE
CERTIFICATE OF CORRECTION

PATENT NO. : 5,868,867
DATED : February 9, 1999
INVENTOR(S) : Mark A. Clukey

It is certified that error appears in the above-identified patent and that said Letters Patent is hereby corrected as shown below:

Col. 4, line 40
      replace "claim 8,"
      with --claim 9,--.

Signed and Sealed this

Twenty-fifth Day of May, 1999

Attest:

Q. TODD DICKINSON

*Attesting Officer*      *Acting Commissioner of Patents and Trademarks*